United States Patent [19]

Spence et al.

[11] Patent Number: 4,677,357
[45] Date of Patent: Jun. 30, 1987

[54] FURNACE DRAFT CONTROL WITH REMOTE CONTROL FEATURE

[76] Inventors: Scott L. Spence, 408 Glenwood Dr.; Thomas E. Hayes, 56727 County Rd. 27; J. Scott Jamieson, 22619 Briarhill Dr., all of Goshen, Ind. 46526

[21] Appl. No.: 786,435

[22] Filed: Oct. 11, 1985

[51] Int. Cl.$^4$ .................... G05B 5/00; F23N 5/18
[52] U.S. Cl. .................... 318/335; 318/481; 110/189; 110/190; 236/260; 126/104 A
[58] Field of Search .......... 318/335, 481, 645; 110/188, 189, 190; 126/110 R, 110 A, 110 AA, 104 R, 104 A, 112, 110 D, 361, 369; 236/26 D, 24.5; 251/58, 61.1

[56] References Cited

U.S. PATENT DOCUMENTS

| | | | |
|---|---|---|---|
| 2,259,119 | 10/1941 | Stoehr | 318/335 |
| 2,820,939 | 1/1958 | Elwell | 318/335 |
| 3,481,538 | 12/1969 | Dines | 236/24.5 |
| 3,489,345 | 1/1970 | Moreland | 236/11 |
| 3,613,391 | 10/1971 | Harter | 318/335 X |
| 3,865,181 | 2/1975 | Mori | 236/11 X |
| 3,918,677 | 11/1975 | Cowan | 251/61.1 |
| 4,004,730 | 1/1977 | Walker | 110/189 X |
| 4,135,487 | 1/1979 | Hays | 126/110 R |
| 4,316,130 | 2/1982 | Louarn | 318/481 X |
| 4,316,420 | 2/1982 | Kochey | 110/190 X |
| 4,334,855 | 6/1982 | Nelson | 236/15 BD |
| 4,467,998 | 8/1984 | Spence | 251/58 |

Primary Examiner—William M. Shoop, Jr.
Assistant Examiner—Patrick C. Keane

[57] ABSTRACT

An apparatus for controlling the speed of a combustion blower motor includes first means for generating an output signal representative of a differential pressure. A second means provides a second signal representative of a desired airflow output of the blower and a summation circuit receives the first signal and the second signal and generates a command signal in response thereto. A power output circuit receives the command signal and responsively provides a regulated level of power to the motor for controlling the speed thereof. The first means may be embodied as a diaphragm-type differential pressure transmitter while the second means may be embodied as an adjustable voltage source or as a source which provides an output signal representative of a temperature.

1 Claim, 5 Drawing Figures

FURNACE DRAFT CONTROL WITH REMOTE CONTROL FEATURE

This invention generally relates to speed control systems for electric motors and more particularly, to an apparatus for controlling the speed of a combustion blower motor.

Combustion furnaces and boilers are in wide use in residential and industrial installations for space heating, for firing water condensing boilers and for other purposes. Heretofore, these heat generating units have been relatively inefficient and their operation has been satisfactory, notwithstanding that there may be rather wide fluctuations in the value of the furnace draft pressure, i.e., that differential pressure existing between the firebox combustion chamber and the surrounding ambient. Several recent developments in the field of highly efficient heat generating units underlie the resulting need for a control system capable of regulating this differential pressure at a very low level and within rather closely defined limits. Such recent developments include the pulse combustion furnace where both the combustion process itself and the exhaustion of the by-products of combustion are required to take place at a carefully controlled differential pressure. Another type of heat generating unit where the close control of this furnace parameter is desirable includes a water condensing boiler where the exhaust gas temperature must be maintained at or slightly below some predetermined value in order to assure that water condensation will occur. Yet another type of unit for which such control is desirable is the subatmospheric burner wherein the controls for modulating the flow of the combustible gas to the burner are designed in such a manner that gas is permitted to flow only if the burner chamber pressure is maintained within a closely defined range and at a level slightly below that of ambient. The rate of gas flow may be controlled by regulating pressure within the range.

An apparatus for controlling the speed of a combustion blower motor whereby heating unit firing rates, firing temperatures and stack discharge pressures may be closely maintained would be a significant advance in the art.

SUMMARY OF THE INVENTION

In general, an apparatus for controlling the speed of a combustion blower motor includes first means for generating an output signal representative of a differential pressure. A second means provides a second signal representative of a desired airflow output of the blower and a summation circuit receives the first signal and the second signal and generates a command signal in response thereto. A power output circuit receives the command signal and responsively provides a regulated level of power to the motor for controlling the speed thereof. The first means may be embodied as a diaphragm-type differential pressure transmitter while the second means may be embodied as an adjustable voltage source or as a source which provides an output signal representative of a temperature.

It is an object of the present invention to provide an apparatus for controlling the speed of a combustion blower motor.

Another object of the present invention is to provide an apparatus whereby the firing rate of a burner may be controlled by regulating a differential pressure.

Still another object of the present invention is to provide a controller which permits the control of a differential pressure which is to be maintained.

Yet another object of the present invention is to provide an apparatus for controlling the speed of a blower motor where the apparatus is required to function at very small differential pressures, on the order of a few inches of water, and to provide a high degree of regulation. How these and other objects will be accomplished will become apparent from the following detailed specification taken in conjunction with the drawing.

DESCRIPTION OF THE PREFERRED EMBODIMENTS

Figure 1:
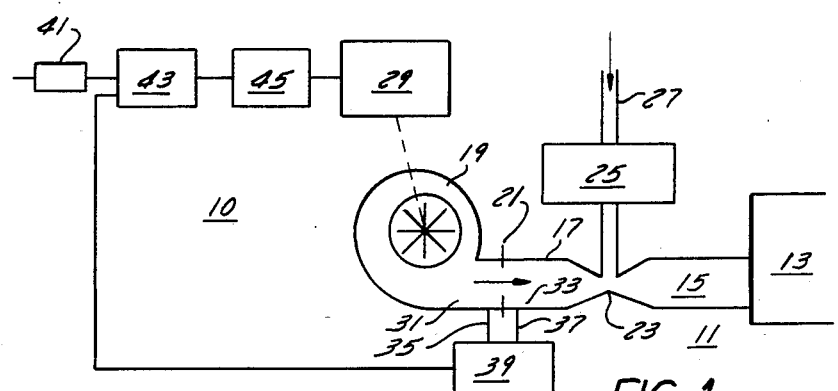
FIG. 1 is a simplified block diagram of an embodiment of the inventive apparatus shown in conjunction with a heat generating unit.

Referring first to FIG. 1, the inventive apparatus 10 is shown in connection with a heat generating unit 11 of the subatmospheric type which includes a burner 13 for carrying out a combustion process, a first duct 15 for flowing an air-fuel mixture to the burner 13 and a second duct 17 having a blower 19 connected thereto for forcing air through an aperture plate 21 and into a Venturi 23 disposed intermediate the first duct 15 and the second duct 17 in a gas flowing relationship. A gas valve and regulator assembly 25 is connected to the Venturi 23 and has an inlet 27 for receiving the gaseous combustible fuel. A blower motor 29 is coupled in driving engagement to the blower 19 and the speed thereof is controlled by the apparatus 10. As air is blown through the aperture plate 21, a differential pressure will result with the pressure on the upstream side 31 of the plate 21 being slightly in excess of that on the downstream side 33. Air flowing through the plate 21 will enter the Venturi 23 which creates a region of subatmospheric pressure, permitting the assembly 25 to flow gas thereinto at a rate which is a function of the value of this subatmospheric pressure. The aforedescribed elements are cooperatively configured so that the proper fuel/air mixture ratio, occurring in the second duct 15 to be directed to the burner 13, is a function of the differential pressure across the plate 21 and therefore, a function of the speed of the blower motor 29. Pneumatic pressure pickup tubes 35, 37 may be mounted at either side of the aperture plate 21 for measuring the differential pressure. It is to be appreciated that the foregoing description is exemplary of how the apparatus 10 may be applied to a subatmospheric heating unit. The inventive apparatus 10 is equally useful upon other types of heat generating units such as water condensing boilers and pulse modulation furnaces where proper operation is dependent upon the control of differential pressure.

Figure 2A:
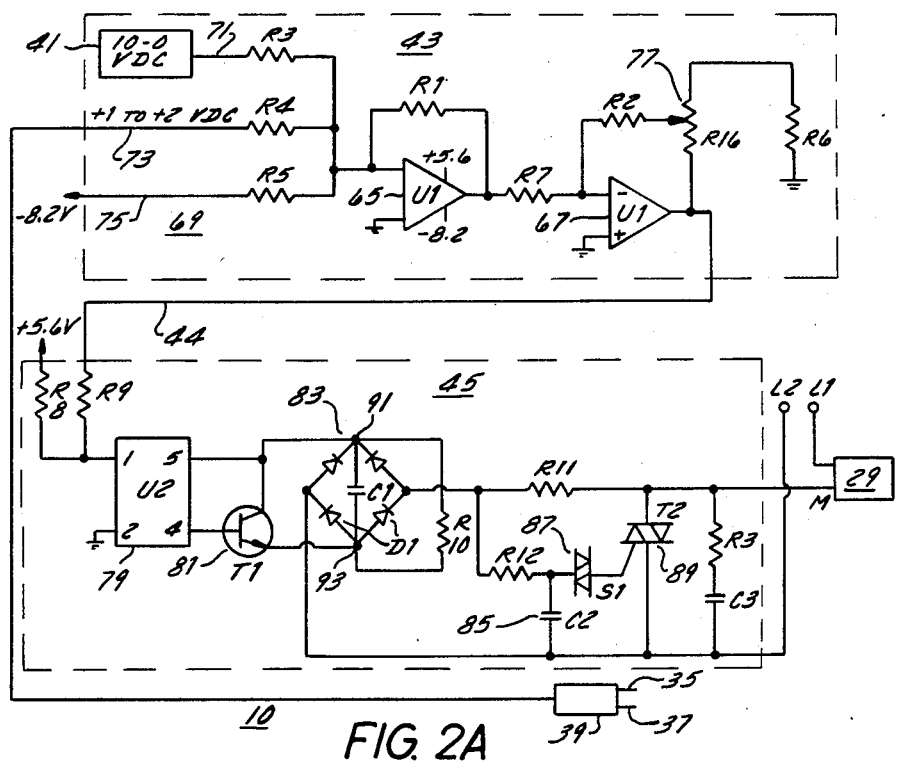
FIGS. 2A and 2B respectively comprise a schematic diagram of the invention and its power supply.
Figure 2B:
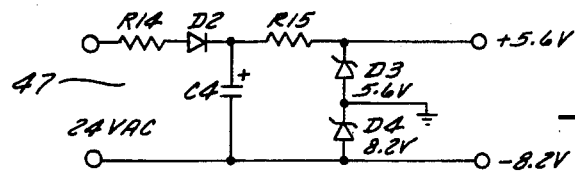

Referring additionally to FIG. 2A, the apparatus 10 is shown to include first means 39 for generating an output signal representative of a differential pressure. Depending upon the type of heating unit with which the apparatus 10 is to be employed, this differential pressure may be between the interior of an air duct and a region of ambient pressure, may be that occurring either side of an aperture plate 21 as described or it may be otherwise. A second means 41 provides a second signal representative of a desired air flow output of the blower 19. A summation circuit 43 receives the first signal and the second signal and generates a command signal in response thereto and along line 44 while a power output circuit 45 receives the command signal and responsively provides a regulated level of power to the blower motor 29 for controlling the speed thereof. The level of power to the blower motor 29 has a relationship to the magnitude of the command signal and as will be appreciated from the description following, in the preferred embodiment this level of power will be inversely rather than directly representative of the command signal magnitude. FIG. 2B illustrates a power supply 47 useful with the circuit of FIG. 2A.

Figure 3:
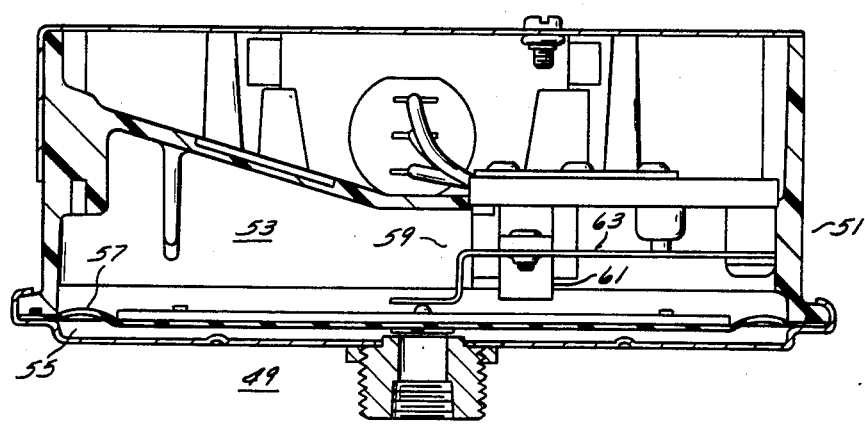
FIG. 3 is a side elevation view of a differential pressure transmitter useful in the invention with portions shown in cross section and other portions shown in full representation.

Referring additionally to FIG. 3, the first means 39 is preferably embodied as a differential pressure transmitter 49 including a housing 51 divided to a first chamber 53 and a second chamber 55 by a thin, highly-resilient diaphragm 57 which maintains the chambers 53, 55 in gas flow isolation one from the other. The transmitter 49 includes a Hall effect device 59 comprising a magnet 61 mounted upon an arm 63 and movable therewith in response to slight movement of the diaphragm 57. The Hall effect sensor (not shown) is mounted closely adjacent the magnet 61 and provides an output signal at its terminals which is representative of the differential pressure across the diaphragm 57 and will preferably be in the range of 1-2 VDC, the value of this first signal being representative of the actual differential pressure sensed by the transmitter 49. In the aforementioned exemplary subatmospheric burner 13, the first chamber 53 would be connected in a pressure sensing relationship to the second duct 15 at the downstream side 33 of the aperture plate 21 while the second chamber 55 would be connected thereto at the upstream side 31 of the plate 21. Further particulars regarding details of construction of such a differential pressure sensing device are shown and described in U.S. Pat. No. 4,467,998 entitled "High Gain Pneumatic Switch" while further particulars of the construction of the transmitter 49 using the device with a Hall effect transducer are described in U.S. patent application Ser. No. 718,745, filed 1 Apr. 1985, titled "Differential Pressure Transmitter" and assigned to the same Assignee as this application. The aforementioned patent and application are incorporated herein by reference.

Referring further to FIG. 2A, the second means 41 is preferably embodied as a stable, low power source of DC voltage of known construction and having an adjustable range of 10-0 VDC. Adjustment may be by knob (not shown) or any other means which might be conveniently calibrated for the user in units of differential pressure which is desired to be maintained within the heating unit 11, in percent of heat output or in some other units. The summation circuit 43 includes a pair of operational amplifiers 65, 67 in cascade, the first amplifier 65 of which has connected thereto a network 69 having a first input 71 for receiving the first signal, a second input 73 for receiving the second signal and a third input 75 for receiving a substantially constant negative bias signal. This network 69 algebraically sums the first, second and bias signals and directs them to the first amplifier 65. A potentiometer 77 may be included for gain adjustment and the gain of the summation circuit 43 is preferably sufficiently great to result in control of the blower motor 29 over its desired speed range with a variation or change in the differential pressure to be controlled of approximately 0.10 inches water.

A preferred power output circuit 45 is embodied using an optically coupled isolator 79 for electrically separating line voltage circuitry from low voltage circuitry. The isolator 79 is coupled to a shunting transistor 81 which in turn, is coupled across a full wave rectifier bridge 83. The isolator 79, the transistor 81 and the bridge 83 coact to control the charge and charging rate of a capacitor 85 coupled to a silicon bilateral switch 87 for control of the firing point thereof. In turn, the switch 87 controls the firing point of the triac 89, the operation of which will control the firing angle of the sine wave voltage being applied to the blower motor 29.

Considering the operation of the transistor 81, bridge 83 and capacitor 85 in further detail, the transistor 81 may be viewed as a variable resistor connected across the bridge nodes 91 and 93. If the transistor 81 is controlled to a state whereby it appears as a relatively high resistance, the capacitor 85 will be permitted to charge at substantially its maximum rate to reach the avalanche potential of the switch 87, e.g., about 8 volts, very early in the phase angle of the sine wave voltage appearing across terminals L1-L2. The result is that the switch 87 and therefore the triac 89 will conduct at a time to permit substantially the entire sine wave voltage to be applied to the motor 29 which will then run at its maximum speed. This circumstance will occur when the summed voltages at the network 69 are relatively low and the output of the amplifier 65 is therefore low. Conversely, if the summation of the network 69 is a relatively high voltage, the transistor 81 will be controlled to appear as a lower resistive value. This increases the time required to charge the capacitor 85 to about 8 volts and therefore, increases the phase angle at which the switch 87 and the triac 89 conduct. The result is a decrease in the RMS voltage applied to the motor 29 and a consequent reduction in motor speed.

Figure 4:
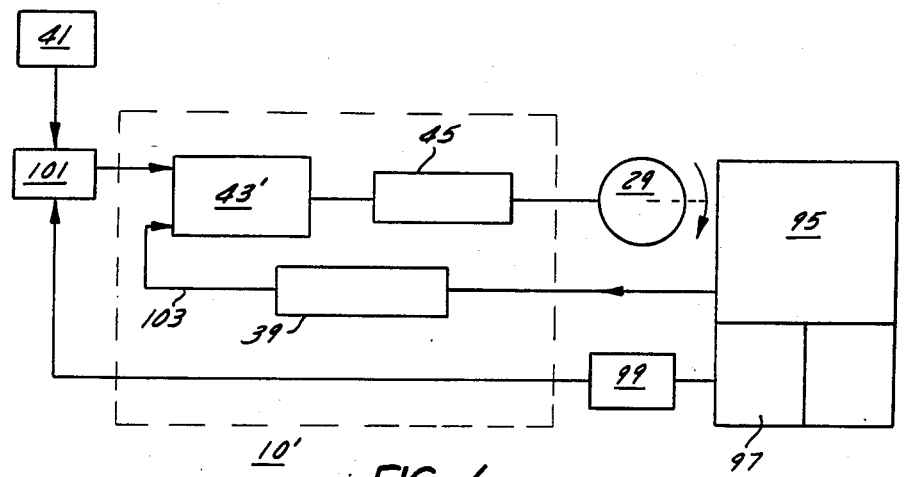
FIG. 4 is a simplified block diagram of another embodiment of the invention shown in conjunction with a heat generating unit.

Referring next to FIGS. 1, 2A, 2B and 4, a second embodiment 10' of the apparatus 10 may be configured for controlling the exhaust gas temperature of a boiler 95 for maintaining the boiler 95 in a water-condensing mode. This is performed by controlling the speed of the blower motor 29, the resulting differential pressure and therefore, the boiler firing rate. In FIG. 4, the first means 39 may be embodied as a differential pressure transmitter for generating a first signal representative of a firing rate. The second means 41 may be embodied as a potentiometer for providing a resistive value, the voltage across which will be a second signal representative of a desired exhaust gas temperature to be maintained. The use of an air flow-gas flow controlling device results in a combustion process within the boiler 95, symbolically represented by the region 97, and a resistive sensor 99 similarly provides a third signal in the form of a voltage representative of the exhaust gas temperature. An error detection circuit 101 resolves any difference between the second signal and the third signal as an error signal and directs that error signal to a summation circuit 43' which also receives the first signal along line 103. The summation circuit 43' receives the first signal and any error signal and generates a command signal in response thereto while the power output circuit 45 will responsively provide a regulated level of power to the blower motor 29.

The following components have been found useful in the construction of the embodiments where resistance is in ohms and capacitance is in microfarads unless otherwise indicated.

| FIGS. 2A, 2B | | | |
|---|---|---|---|
| C1 | 10/50 V. | C2, C3 | .1/250 V. |
| C4 | +330/50 V. | D1, D2 | IN4004 |
| D3 | 5.6 V. | D4 | 8.2 V. |
| R1, R7, R9, R16 | 10K | R2 | 22K |
| R3 | 43K | R4 | 4.3K |
| R5 | 18K | R6 | 470 |
| R8 | 20K | R10 | 82K |
| R11 | 15K | R12 | 33K |
| R13 | 100 | R14 | 47 |
| R15 | 1K | S1 | 2N4991 |
| T1 | 3904 | T2 | SC140M |
| U1 | 558 | U2 | TIL117 |

While only a few preferred embodiments have been shown and described herein, the invention is not intended to be limited thereby but only by the scope of the claims which follow.

We claim:

1. An apparatus for controlling the exhaust gas temperature of a heat generating unit and including:

first means for providing a first DC signal representative of a differential pressure within a duct of said unit, said first means including a differential pressure transmitter having a resilient diaphragm, a Hall effect magnet and a Hall effect sensor, said diaphragm being movable with changes in the magnitude of said differential pressure, said sensor being stationary with respect to said diaphragm, said magnet being movable with said diaphragm for effecting changes in said first signal;

second means for providing a second DC signal representive of a desired exhaust gas temperature;

means for providing a third signal representative of the actual exhaust gas temperature;

detecting means for receiving said second signal and said third signal and responsively generating an error signal representative of a difference therebetween;

a summation circuit for receiving said first signal and said error signal and generating a command signal in response thereto, and;

a power output circuit for receiving said command signal and responsively resulting in a regulated speed of a blower motor, thereby effecting control of said exhaust gas temperature solely by regulation of the speed of said motor.

* * * * *